Sept. 27, 1938.  C. A. DUNHAM ET AL  2,131,555
GENERATING HEATING MEDIUM
Filed Dec. 13, 1935  3 Sheets-Sheet 2

Inventors
Clayton A. Dunham
Aubra R. Dunham
By Barnett & Truman
Attorneys.

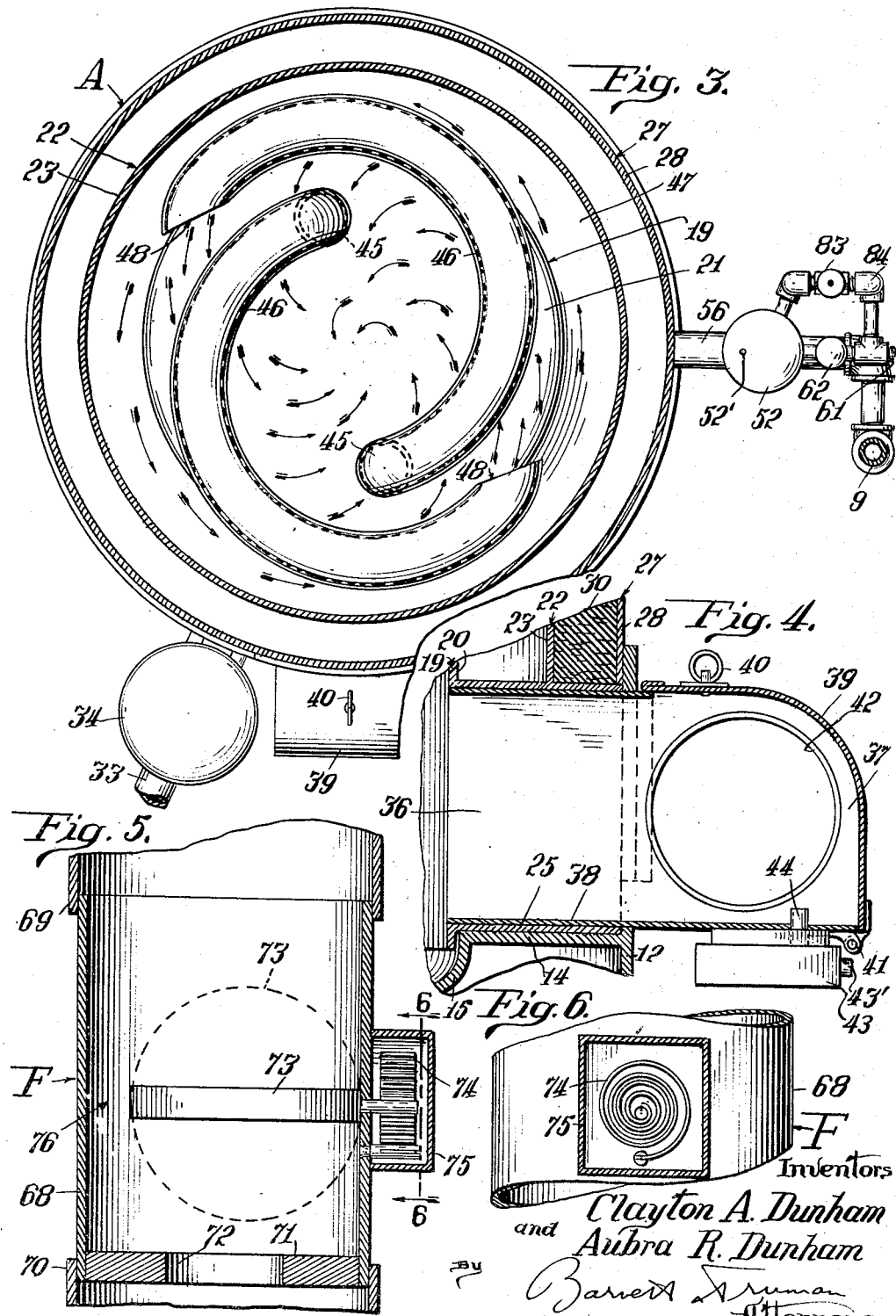

Patented Sept. 27, 1938

2,131,555

UNITED STATES PATENT OFFICE 2,131,555

GENERATING HEATING MEDIUM

Clayton A. Dunham and Aubra R. Dunham, Glencoe, Ill., assignors to Experimental Laboratories, Inc., Chicago, Ill., a corporation of Illinois Application December 13, 1935, Serial No. 54,299

7 Claims. (Cl. 237—67)

This invention relates to a new and improved apparatus for generating a heating medium consisting of mixed steam and products of combustion for use in a heating system.

In the type of heating system to which this invention relates, fuel is burned in proximity to an enclosed body of water and the products of combustion are passed in intimate contact with the water so as to form steam, and the heating medium consisting of the mixed steam and products of combustion is delivered into radiators wherein the steam is condensed and also a large portion of the heat from the products of combustion is used for heating purposes. The cooled non-condensable gases are withdrawn from the radiators thus causing the continuous circulation of the heating medium, and the condensate from the steam is returned to the generator to be reconverted into steam.

The present invention relates to an improved generator and process of generating the heating medium, suitable for use in a heating system of the type briefly described hereinabove. Briefly described, this generating apparatus comprises a closed housing in which is confined a combustion chamber wherein the fuel is burned or into which the products of combustion are directly introduced. This combustion chamber is surrounded at the sides and top by a body of water so that practically all of the heat not retained by the products of combustion is absorbed by the water. The exposed surface of this body of water forms the lower wall of a mixing chamber into which the products of combustion are introduced from the combustion chamber so as to be directed into contact with the surface of the water. The steam generated within this mixing chamber is combined with the products of combustion and withdrawn as a mixed heating medium which is introduced into the radiators. The condensate from the radiating system is returned to the body of water, and means is provided for automatically draining away any excess water, or adding additional water if required, so that the body of water within the generator will be maintained at a substantially constant level. The entire generator is enclosed by an insulating wall so that the loss of heat is minimized, practically all of the heat in the products of combustion being utilized in generating steam, or carried to the radiators by the products of combustion.

The principal object of this invention is to provide an improved apparatus for generating mixed fluid heating medium, such as briefly described hereinabove and disclosed more in detail in the specifications which follow.

Another object is to provide improved means for maintaining a substantially constant water level within the generator.

Another object is to provide improved means for removing sediment from the water.

Another object is to provide improved means for controlling the draft on the generator.

Another object is to provide improved means for removing floating scum from the water.

Other objects and advantages of this invention will be more apparent from the following detailed description of certain approved forms of apparatus constructed and operating according to the principles of this invention.

In the accompanying drawings:

Fig. 3 is a horizontal section taken substantially on the line 3—3 of Fig. 2.

Fig. 4 is a vertical section through the pilot door, the view being taken on the line 4—4 of Fig. 1 but on a larger scale.

Fig. 5 is a vertical section through the automatic draft controlling valve.

Fig. 6 is a vertical section taken substantially on the line 6—6 of Fig. 5.

Figure 1:
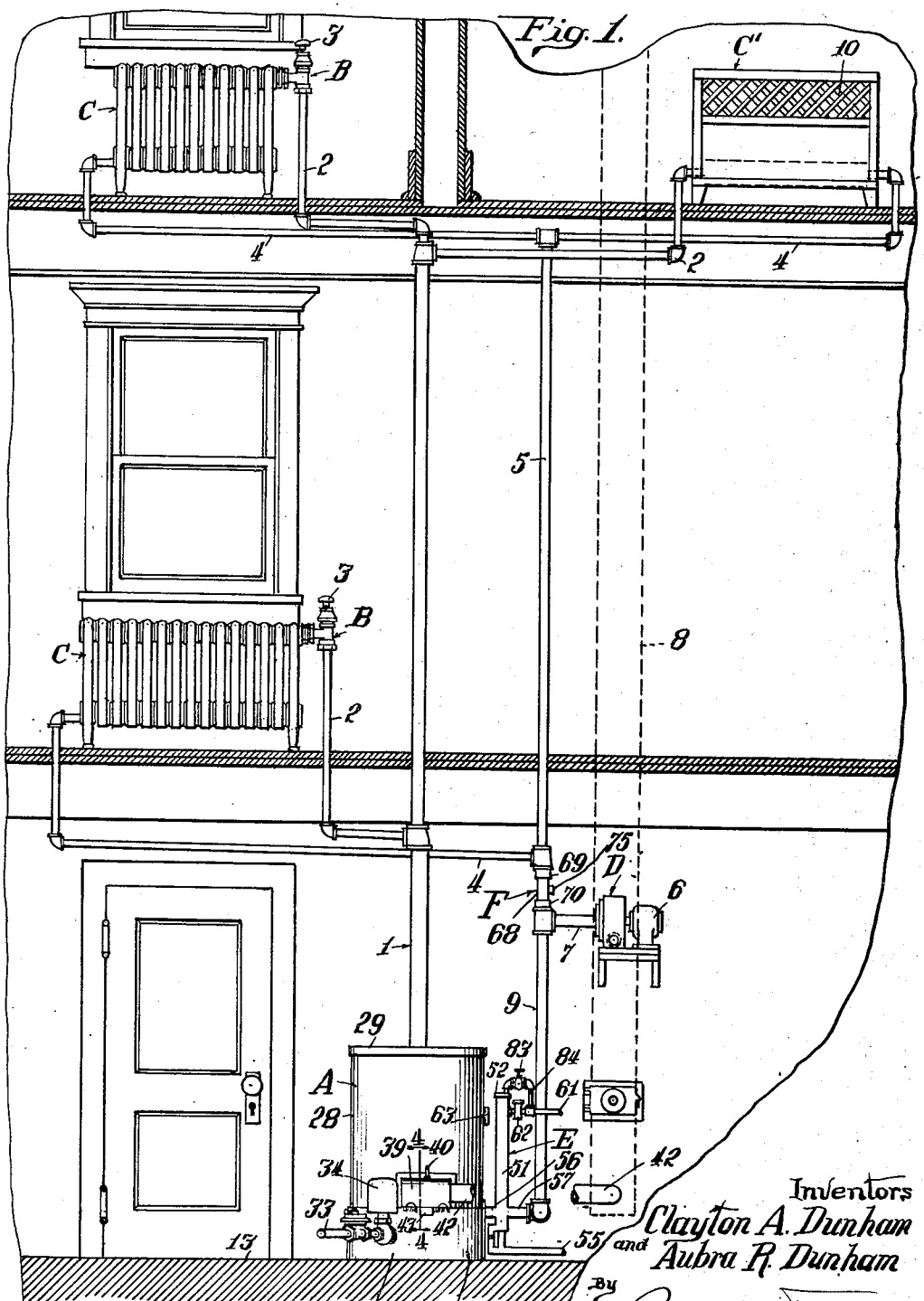
Fig. 1 is an elevation showing the principal elements of a heating system in which this improved generator may be used, the generator and associated parts being shown in elevation.

Referring first to the general heating system as indicated in Fig. 1, the improved generator A discharges the heating medium through the main supply pipe 1, and through branch pipes 2 and inlet valves B into the several radiators C. Each of these inlet valves B preferably includes a cut-off valve of usual type operated by the hand wheel 3, and also preferably includes an orifice plate through which the heating medium is admitted to the radiator, these orifices being made of different sizes in accordance with the capacity of the individual radiators and the position of these radiators in the heating system, so that the heating medium will be properly distributed amongst the several radiators. Branch return pipes 4 lead into the main return pipe 5. The exhauster D operated by motor 6 is connected through pipe 7 with the lower portion of return main 5, this exhauster withdrawing cooled non-condensable gases from the radiators and discharging these gases into the flue 8. The withdrawal of these gases, together with the condensation of steam in the several radiators causes a partial vacuum extending back to the generator A so as to withdraw the heating medium therefrom and keep up the circulation through the heating system. The condensate formed in the radiators C and the piping drains out by gravity through the return pipes 4 and 5 and thence through pipe 9 which extends downwardly from pipe 5 below the level of the connection to the exhauster D. The pipe 9 communicates at its lower end with the water level controller E which in turn communicates with generator A, all as will be hereinafter disclosed in detail. Heating systems of this type may be provided with manual and automatic controls for the burners and the exhausting mechanism, one example of such a system being disclosed in our copending application Serial No. 558,293, filed August 20, 1931.

In order that there shall be a minimum draft through the system at all times, even though all of the radiator inlet valves B are closed, a constantly open small port may be provided in one of the valves, or the inlet valve may be omitted on one small radiator. For example, the concealed radiator indicated at C' may be constantly open to the flow of heating medium. The heating effect of this radiator may be minimized at any time by closing the grille indicated at 10.

Figure 2:
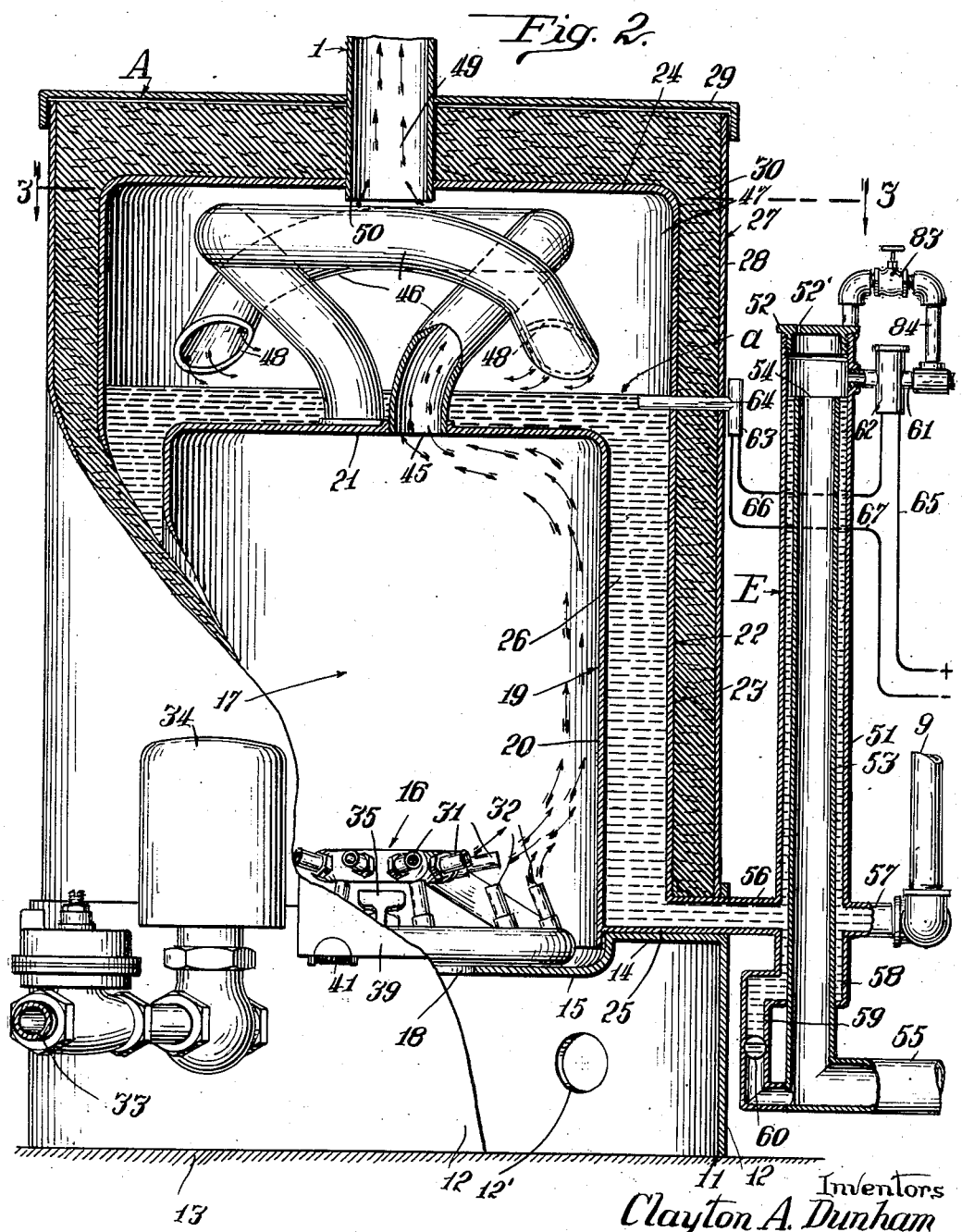
Fig. 2 is an enlarged elevation of the generator and water-level control apparatus, these elements being for the most part broken away and shown in central vertical section.

Referring now to Fig. 2, the improved generator A, and the apparatus E by which the water level in the generator is controlled, will be described more in detail. The generator A is preferably made for the most part of metal, and is suitably insulated to minimize heat losses. The lower substantially closed metallic housing or base member 11 comprises the cylindrical skirt portion 12 (provided with air-inlet openings 12') which rests on the supporting pedestal or floor 13, the upper annular supporting flange 14, and the central downwardly dished portion 15 which supports the burner mechanism indicated generally at 16. This lower dished wall 14 also closes the bottom of the combustion chamber 17 except for the central opening 18 through which fuel and air are admitted to the burner mechanism 16. An inner shell 19 comprising the cylindrical side walls 20 and top wall 21 completes the enclosure for the combustion chamber. Spaced from this inner shell is a first outer shell 22 comprising the cylindrical side walls 23 and top wall 24, the lower portions of the cylindrical walls of the two shells 19 and 22 being joined by an annular bottom wall 25 which rests upon the supporting flange 14 of the base member. The annular space between the cylindrical walls 20 and 23 of the respective inner and outer shells is normally filled with a body of water indicated at 26, this body of water normally extending up to the level indicated at a so as to completely enclose both the side walls 20 and top wall 21 of the inner shell 19 which houses the combustion chamber. A second outer shell 27 comprising the side walls 28 and top wall 29 is spaced from the first outer shell, the space between these shells being filled with insulating material indicated at 30 so as to minimize heat losses.

The burner 16 may be of any desired form and may be either located within the combustion chamber 17 as here shown, or outside the chamber so as to project the flames therein. Preferably gas is used as a fuel although oil or other fuels might be used. As here shown, the burner comprises an annular series of substantially radially projecting nozzles 31 and a second annular series of upwardly projecting nozzles 32, the flames from these several nozzles impinging to form an annular sheet of flame which is projected upwardly and outwardly toward and along the side walls 20 of the inner shell 19. The flames and hot products of combustion follow the path indicated by the small arrows in Fig. 2, thereby serving not only to heat the surrounding body of water but to scour the inner walls of the shell and keep them free from soot or other deposits.

The fuel supplied to main burner 16 through pipe 33 is controlled by valve 34, preferably electrically operated in accordance with changes in temperature conditions at predetermined locations. A constantly burning pilot-flame 35 serves to ignite the main burner. This pilot-flame is accessible for lighting and may be observed through the passage 36 (Fig. 4), projecting through the several walls of the generator. This passage extends outside the generator as a casing having end-walls 37 and a bottom wall 38, and closed at the front and top by the curved door 39. This door may be swung open by the pull-ring 40, and will be automatically held in closed position by the spring-hinges 41 through which the door is pivoted to the bottom wall 38. A small vent pipe 42 extends from one end of the casing to the flue 8 or some other suitable place of discharge and serves to vent the gases from the pilot-burner when the exhaust fan 6 is not in operation.

The door 39 may also open automatically to relieve any abnormal pressures that may develop in the combustion chamber. Ordinarily the pressure in the combustion chamber will be somewhat below atmospheric so that door 39 will be held closed by the higher external pressure.

A safety switch 43 mounted on the bottom wall 38 comprises a trip-switch which is closed by pressing in the button 43'. The trip mechanism comprises a temperature responsive element 44 which projects into the casing or passage 36. If an abnormally high temperature develops in this passage, the element 44 will expand and trip the switch causing it to open and break a control circuit thus closing the main fuel supply valve 34. Safety switch mechanisms and control circuits of this type are well known in the art, and are not a part of the present invention except as used in the present combination.

The products of combustion pass out through one or more outlet openings 45 in the top wall 21 of the combustion chamber. Although any suitable number could be used, in the present example there are two of these outlet openings 45 positioned adjacent opposite sides of the shell. From each of these outlet openings a conduit 46 curves upwardly and laterally of the mixing chamber 47 and then downwardly so as to terminate adjacent the exposed surface a of the body of water, all as shown in Figs. 2 and 3. This mixing chamber 47 is enclosed by the shell 22 at the top and sides and by the exposed surface of the body of water at the bottom. The lower outlet end of each conduit 46 is cut away on the inner side as indicated at 48 (Figs. 2 and 3), preferably at an angle of about 45° with the surface of the underlying body of water so that the products of combustion will be directed downwardly and laterally along the surface of the water. The outlets of all of the conduits 46 are directed in the same general direction so that a whirling motion will be imparted to the gases within mixing chamber 47, the gases circulating in a counter-clockwise direction as viewed from above in Figs. 2 and 3 although it will be apparent that this direction of rotation could be reversed by appropriately changing the curvature of tubes 46.

The hot products of combustion are at a temperature considerably above the boiling point of water. The water will first be highly heated by heat transferred through the inner shell 19, and will be further heated by the direct contact of the heated gases on the surface of the water within mixing chamber 47. As a consequence a considerable volume of steam will be developed which will be mixed with the products of combustion to form the heating medium which is drawn out through outlet conduit 49 which projects upwardly through the upper shell walls 24 and 29 and connects with the supply conduit 1 (Fig. 1). Conduit 49 extends downwardly into the mixing chamber to form a lip 50 from which moisture will drip straight downwardly and not contact with the hot tubes 46, which tubes, it will be noted, are so curved that no portions thereof lie directly beneath the drip-rim 50.

In order that this generator may operate at its highest efficiency, it is preferable that the body of water therein be maintained at a predetermined constant level (indicated at a) at all times. In order to do this automatically the apparatus indicated at E is provided. This apparatus comprises an upright tubular container 51 closed at its top by a removable inspection cover 52 provided with a small air vent opening 52'. Within container 51 is an overflow pipe 53 having its open upper end 54 positioned at the desired water level a within the generator. The lower end of pipe 53 communicates with a drain pipe 55 leading to the sewer or other point of discharge. The lower end of the water chamber within the generator is in open communication through pipe 56 with the lower portion of container 51. The lower end of pipe 9 through which condensate drains from the heating system is connected through the pipe connection 57 with the lower portion of container 51, preferably at the opposite side of overflow pipe 53 from the generator supply pipe 56 just described. The lower end of container 51 projects below the bottom of the water chamber in the generator so as to form a sediment collecting pocket 58 from which a pipe connection 59 provided with normally closed valve 60 leads to the drain pipe 55. By opening the valve 60 the sediment pocket can be flushed out, or if desired the entire water system can be drained.

It will now be apparent that condensate returned from the heating system through pipe 9 will flow through pipes 57 and 56 into the container 51 and chamber 26 within the generator, the water being maintained at the same level in both of these containers. If the water level rises above the desired level a, the overflow will pass out through pipe 53 into the drain 55. When the fan D is in operation, the suction reduces the pressure in chamber 47 so that the water level rises somewhat. When the fan is stopped, at intervals, this water-level falls so that the level will rather suddenly rise in container 51 and overflow into pipe 53. This will serve to skim off the floating scum that is returned with condensate from the heating system and rises to the surface in container 51.

After the heating system is once started, there will normally be a surplus of water in the system since the supply is augmented by the watery vapors formed in the process of combustion. This will normally offset the losses through leakage and the vapors which pass out through the exhausting mechanism and flue 8. Any such excess liquid returned along with the condensate will be discharged through overflow pipe 53 while still relatively cool thus avoiding the waste of heat through the drain.

Pipe 61 leading from the city water supply communicates with the upper portion of container 51, this pipe being provided with the normally closed valve 62. By opening this valve, or the hand-valve 83 in by-pass 84, the apparatus may be initially filled with water, and additional water may be added whenever needed to replenish the water supply. The valve 62 is preferably controlled automatically in response to changes in the liquid level within the generator. In the example here shown this valve 62 is controlled electrically by means of the thermostatically actuated switch 63. Thermostat 64 projects into the body of water 26 directly below the water level a. This thermostat will not be subjected to a temperature of over 212° Fahrenheit as long as the water is maintained at the desired level. In case the water level falls, thermostat 64 will be exposed to the more highly heated gases in mixing chamber 47 thereupon functioning in well-known manner to operate switch 63 and close the circuit indicated by wires 65, 66 and 67 so as to open valve 62 and admit more water to the system. As soon as the water has been restored to the desired level, the temperature to which thermostat 64 is subjected will be lowered to at least 212° Fahrenheit whereupon switch 63 will open thus breaking the electric circuit to permit valve 62 to again close and cut off the water supply. It will be noted that this system is entirely automatic, the water level in the generator being maintained at all times at the desired height, and additional water from the outside water supply is only admitted when the condensate returned from the heating system is insufficient to properly replenish the body of water in the generator. Ordinarily more water than necessary will be returned from the heating system, in which case the excess water is automatically drained out. The electrical control connections may also be arranged so the main fuel valve 34 is closed while valve 62 is open to admit additional water, this being merely an additional safety precaution.

The suction on the generator is preferably controlled by means of an automatically operating damper F, best shown in Figs. 5 and 6. This may be installed at any desirable location in the suction line. As shown in Fig. 1 it is connected between the pipes 5 and 9, just above the pipe 7 leading to fan 6. This device comprises a pipe-section 68 joined at its upper and lower ends through couplings 69 and 70 with the conduits which it connects. In the pipe-section is positioned a metering plate 71 having a fixed orifice 72 of a size particularly adapted to the draft requirements of the installation. A pivotally mounted valve 73 is moved from the closed position shown in solid lines to the open position indicated in dotted lines, by means of a coiled metallic thermostatic element 74 positioned in a compartment 75 at one side of pipe-section 68. Heat from the gas passing through the pipe will be transmitted through the pipe wall to the thermostatic element 74. When cold, the valve will be in closed position, but the valve when in this position does not entirely close the passage so that a minimum flow of gas is permitted at 76 at all times. As the temperature of the withdrawn gases rises, the valve will be swung toward open position thus increasing the effective size of the passage. It will be understood that more friction exists when the system has been warmed up fully, and there is a greater load to be taken care of by the fan. At this time the passage is fully opened. During the starting up period, the passage is partially closed thus avoiding the passage of excessive amounts of air or gases through the system with the attendant waste of heat through the stack. Since the pressure in the system and generator varies with the temperature, pressure actuated means for moving the air valve 73 or its equivalent may be controlled by this pressure variation, to obtain results similar to those obtained by the temperature controlled valve.

This improved type of generator is very efficient since practically all of the heat generated is utilized, the generator is small, neat and compact, and it requires practically no attention. It will be understood that suitable temperature-controlled devices are provided for regulating the fuel supply so that the burner 16 can be cut off when no additional heat is required, and the generating process can again be started immediately at any time by simply re-igniting the burners from the constantly burning pilot means, since the requisite body of water is always present within the generator.

While the generator and its component shells have been described as cylindrical, it will be apparent that these elements could be given almost any other desired cross-sectional configuration without departing from the principles of this invention. The same is true of the tubular container 51, which is preferably cylindrical and of not much larger diameter than the overflow pipe 53, but could obviously be made larger or of other cross-sectional configuration if desired.

We claim:

1. A generator for a mixed fluid heating medium consisting of products of combustion and steam, comprising a housing enclosing a combustion chamber, a second housing enclosing the first housing so as to hold a body of water around the combustion chamber and also enclosing a mixing chamber, a conduit for delivering products of combustion from the combustion chamber into the mixing chamber in contact with the surface of the body of water, an outlet for the heating medium leading from the mixing chamber, a main burner in the combustion chamber, means for supplying fuel and air thereto, a pilot-burner in the combustion chamber, there being a passage formed through the generator housings to give access to the pilot-burner, an outwardly opening door at the outer end of this passage, means for yieldably holding the door in closed position, a vent communicating with the outer end of the passage, and an open flue leading from this vent.

2. A generator for a mixed fluid heating medium consisting of products of combustion and steam, comprising a housing enclosing a combustion chamber, a second housing enclosing the first housing so as to hold a body of water around the combustion chamber and also enclosing a mixing chamber, a conduit for delivering products of combustion from the combustion chamber into the mixing chamber in contact with the surface of the body of water, an outlet for the heating medium leading from the mixing chamber, a main burner in the combustion chamber, means comprising an electrically operated cut-off valve for supplying fuel and air thereto, a pilot-burner in the combustion chamber, there being a passage formed through the generator housings to give access to the pilot-burner, an outwardly opening door at the outer end of this passage, means for yieldably holding the door in closed position, a vent communicating with the outer end of the passage, and a temperature responsive switch adjacent the vent for closing the cut-off valve to cut off the supply of fuel to the main burner when a predetermined maximum temperature is reached in the passage.

3. In combination with a generator for a mixed fluid heating medium, said generator comprising a chamber adapted to contain a body of water of substantially constant level, an upright container positioned adjacent the generator, an overflow pipe positioned within the container with its open upper end located at the height of the desired water level within the generator, a drain pipe in open communication with the lower end of the overflow pipe, a conduit connection between the lower portions of the chamber and the container, means for supplying water to the container, the lower portion of the container extending below the bottom of the chamber to form a sediment collecting pocket, and a valved connection between the sediment pocket and the drain pipe.

4. In combination with a generator for a mixed fluid heating medium, said generator comprising a chamber adapted to contain a body of water of substantially constant level, an upright container positioned adjacent the generator, an overflow pipe positioned within the container with its open upper end located at the height of the desired water level within the generator, a drain pipe with which the lower end of the overflow pipe communicates, a conduit connection between the lower portions of the chamber and the container, a pipe for supplying water to the container, a normally closed supply valve in this pipe, and means comprising a member positioned in the generator at the water level for opening the supply valve when the water falls below this level.

5. In combination with a generator for a mixed fluid heating medium, said generator comprising a chamber adapted to contain a body of water of substantially constant level, an upright container positioned adjacent the generator, an overflow pipe positioned within the container with its open upper end located at the height of the desired water level within the generator, a drain pipe with which the lower end of the overflow pipe communicates, a conduit connection between the lower portions of the chamber and the container, a pipe for supplying water to the container, a normally closed electrically actuated valve in this pipe, a switch in the valve-operating circuit, and a thermostat positioned in the generator adjacent the water-level and adapted to operate the switch in response to temperature changes as the water moves into or out of contact with the thermostat.

6. In combination with a generator for a mixed fluid heating medium, said generator comprising a closed chamber adapted to contain a body of water, intermittently operating suction means adapted to withdraw heating medium from the chamber and thereby periodically lower the pressure therein and raise the water level, an upright container positioned adjacent the generator, an overflow pipe positioned within the container with its open upper end determining the normal water level within the generator, the space above the overflow pipe being under atmospheric pressure, a conduit connection between the lower portions of the chamber and container, and a pipe through which condensate from the heating medium is returned to the container, the fluctuating water level in the container due to the intermittent pressure changes in the mixing chamber causing the upper portion of the water in the container to periodically spill into the overflow pipe, thereby removing accumulated scum.

7. In cobination with a generator for a mixed fluid heating medium, said generator comprising a closed mixing chamber adapted to contain a body of water, and means for introducing heated gases into the mixing chamber, a conduit system through which the heating medium from the mixing chamber is drawn, a suction means communicating with the conduit system and a thermostatically operated valve in the conduit system adapted to provide a minimum suction passage therethrough when the fluids drawn through the conduit are cold and a maximum passage when the fluids are hot.

CLAYTON A. DUNHAM.
AUBRA R. DUNHAM.